No. 792,529. PATENTED JUNE 13, 1905.
W. W. MARSH.
LINER FOR CENTRIFUGAL LIQUID SEPARATORS.
APPLICATION FILED SEPT. 26, 1904.

WITNESSES:
INVENTOR.
Wilbur W. Marsh,
BY
ATTORNEY.

No. 792,529. Patented June 13, 1905.

UNITED STATES PATENT OFFICE.

WILBUR W. MARSH, OF WATERLOO, IOWA.

LINER FOR CENTRIFUGAL LIQUID-SEPARATORS.

SPECIFICATION forming part of Letters Patent No. 792,529, dated June 13, 1905.

Application filed September 26, 1904. Serial No. 225,874.

*To all whom it may concern:*

Be it known that I, WILBUR W. MARSH, a citizen of the United States of America, and a resident of Waterloo, Blackhawk county, Iowa, have invented certain new and useful Improvements in Liners for Centrifugal Liquid-Separators, of which the following is a specification.

My invention relates to improvements in liners for centrifugal liquid-separators; and the object of my improvement is to furnish a liner built up of superimposed separating devices formed in such a manner as to more effectually give vent to the lighter constituent of the liquid toward the axis of the separator-bowl, thus preventing rapid clogging of the machine and perfecting the process of separation of the differing constituents. This object I have accomplished by the means which are hereinafter described and claimed and which are illustrated in the accompanying drawings, in which—

Figure 2:
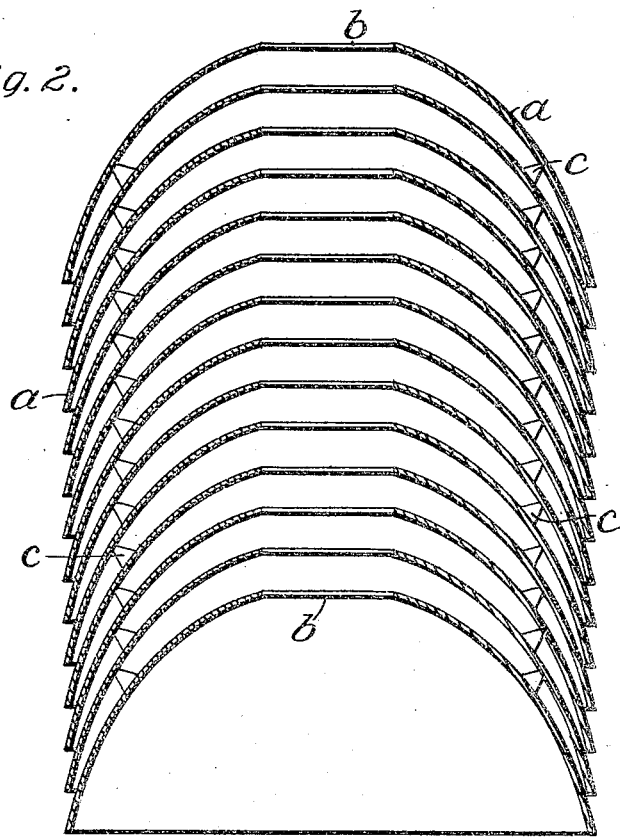
Figure 1:
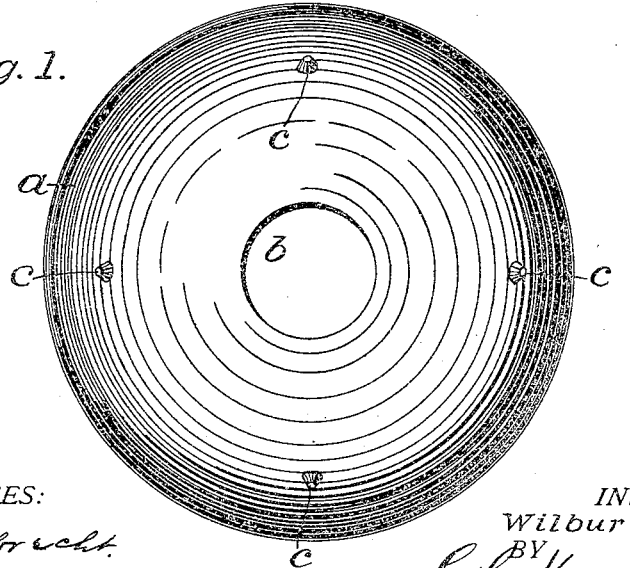

Figure 1 is a plan view of one of my improved forms of separating devices, and Fig. 2 is a vertical transverse section of a series of superimposed separating devices of my improved type as they would appear when set up for use in a separator-bowl.

Similar letters refer to similar parts throughout both views.

The separating device or disk *a* is formed with a curved surface, as shown, although I do not mean to confine myself to any particular form of curve in delineating the superficies of the disks. The lower part of the disk is open, while the upper part is provided with a smaller opening *b* for the reception of the inflowing liquid to be separated. In use the disks are superimposed as shown and are kept a suitable distance apart by means of studs *c c*, &c., on their upper surfaces. Other means for keeping the disks apart may be used, however, without departing from the principle of my invention, which is to so curve the disks downward that the spaces between their outer and lower edges are of much less dimensions and width than are the spaces between their inner and upper edges. This is most perfectly effected by means of a curved disk, and the result in use of this form of disk and the narrowing of the width between the disks is to provide freer passage inward for the separating lighter constituent of the liquid while under the action of centrifugal force.

When used to separate cream from milk, it has been found that when the temperature of the milk is considerably lowered from the ordinary and usual degree the butter molecules in the cream are somewhat congealed and tend to cling to and clog the passages of a separator of ordinary type. To obviate this, the improved construction above set forth by giving greater freedom of vent to the cream than the milk already skimmed prevents the clogging of the surfaces of the disks by clotted cream. The heavier molecules of the blue or skimmed milk are enabled to find sufficient vent under the influence of the powerful centrifugal force through the narrower spaces near the outer peripheries of the disks. The retardation of the separating milk, also induced by the narrowing of these spaces, also permits a more complete separation, and the curved form of the disks also affords less opportunity for the congealing butter globules to stick and clog.

Having described my invention, what I claim as new, and desire to secure by Letters Patent, is—

1. A liner for centrifugal liquid-separators, consisting of a series of superimposed separating-disks each of which is provided with means for spacing its surface apart from that of the next adjacent disk, and each disk being so formed that the widths of the spaces between it and its adjacent disks are gradually narrowed in a direction outward from the axis of said disks.

2. A liner for centrifugal liquid-separators, consisting of a series of superimposed curved separating-disks, with registering central openings, each disk being provided with means for spacing its surface apart from that of the next adjacent disk, and each disk being so formed that the width of the spaces between it and its adjacent disks are gradually narrowed in a direction outward from the axis of said disks.

Signed at Waterloo, Iowa, this 17th day of September, 1904.

WILBUR W. MARSH.

Witnesses:
  ELIZABETH M. HARRISON,
  ANNA MEADER.